United States Patent [19]
Laing

[11] 3,888,304
[45] June 10, 1975

[54] TEMPERATURE-CONTROL SYSTEM USING THERMOSIPON EFFECT

[76] Inventor: Nikolaus Laing, Hofener Weg 35-37, 7141 Aldingen, Germany

[22] Filed: Mar. 13, 1972

[21] Appl. No.: 234,433

Related U.S. Application Data

[60] Division of Ser. No. 847,771, June 17, 1969, abandoned. Continuation-in-part of Ser. No. 802,704, Dec. 11, 1968, abandoned. Continuation-in-part of Ser. No. 585,819, Oct. 11, 1966, abandoned.

[52] U.S. Cl. .................. 165/86; 62/499; 165/121; 165/125; 165/107; 165/75
[51] Int. Cl. ................ F28d 11/00; F28f 5/00
[58] Field of Search ....... 165/121, 122, 34, 88, 125; 62/325, 499; 417/420; 418/172

[56] References Cited
UNITED STATES PATENTS

| | | | |
|---|---|---|---|
| 1,145,226 | 7/1915 | Bertsch | 62/499 |
| 2,402,307 | 6/1946 | Vannerus | 165/121 |
| 2,680,007 | 1/1954 | Arbuckle | 165/34 |
| 3,025,684 | 3/1962 | McLain et al. | 62/499 |
| 3,188,829 | 6/1965 | Siewert et al. | 62/324 |
| 3,189,262 | 6/1965 | Hanson et al. | 418/172 |
| 3,299,819 | 1/1967 | McCoy | 417/420 |
| 3,347,059 | 10/1967 | Laing | 62/325 |

*Primary Examiner*—Charles J. Myhre
*Assistant Examiner*—Theophil W. Streule, Jr.
*Attorney, Agent, or Firm*—Karl F. Ross; Herbert Dubno

[57] ABSTRACT

The interior of a housing for electronic equipment, generating heat, is cooled by a heat recuperator comprising a pair of coaxial rotors respectively disposed inside and outside the housing, these rotors having hollow bodies intercommunicating through passages in a common shaft traversing the housing wall. The inner rotor is of larger diameter than the outer one whereby a heat-carrier medium, passing through the rotors in a closed path sealed against the atmosphere, is kept circulating by a thermosiphon effect.

12 Claims, 2 Drawing Figures

3,888,304

TEMPERATURE-CONTROL SYSTEM USING THERMOSIPON EFFECT

CROSS-REFERENCE TO RELATED APPLICATIONS

This application is a division of my application Ser. No. 847,771, now abandoned, filed 17 June 1969 as a continuation-in-part of my formerly copending and now also abandoned application Ser. No. 802,704, filed 11 Dec. 1968, and 585,819, filed 11 October 1966.

FIELD OF THE INVENTION

My present invention relates to a heat-recuperating system for controlling the temperature in a space in which a first fluid — generally air — is independently maintained at a temperature differing substantially from that of a second fluid — generally also air — in an adjoining environment separated from that space by a wall.

BACKGROUND OF THE INVENTION

Heat generated by, say, electronic equipment within a housing must be dissipated to the outside as rapidly as it is produced. It is frequently desirable that this be accomplished without air circulation between the interior and the exterior of the housing.

OBJECTS OF THE INVENTION

The general object of my present invention is to provide an efficient temperature-control system for the purpose set forth, particularly for cooling an enclosed space containing an independent heat source.

A more specific object of my invention is to provide a system of this nature, comprising a hollow rotor structure wherein a heat-carrier medium moves in a closed circuit, which does not require any complex mechanism for driving that medium.

SUMMARY OF THE INVENTION

I realize these objects, in accordance with the present invention, by the provision of a first hollow rotor body in the space to be thermally controlled and a second hollow rotor body in the adjoining environment, the two rotor bodies being interconnected by a motor-driven shaft which traverses the intervening wall preferably with formation of a fluidtight seal therebetween. The shaft has two passages communicating with the interiors of both rotor bodies and forming therewith a closed path, sealed against the atmosphere, for the circulation of the aforementioned heat-carrier medium which thereby abstracts heat from the warmer surrounding fluid (e.g. air in an enclosed space to be cooled) and gives off heat to the colder surrounding fluid (e.g. ambient air). The path for the circulation of the heat carrier includes radial extensions in each rotor body, the extensions in one rotor body differing in length from those in the other rotor body to create a thermosiphon effect as the sole means for circulating the carrier.

BRIEF DESCRIPTION OF THE DRAWING

The above and other features of my invention will now be described in detail with reference to the accompanying drawing in which.

SPECIFIC DESCRIPTION

Figure 1:
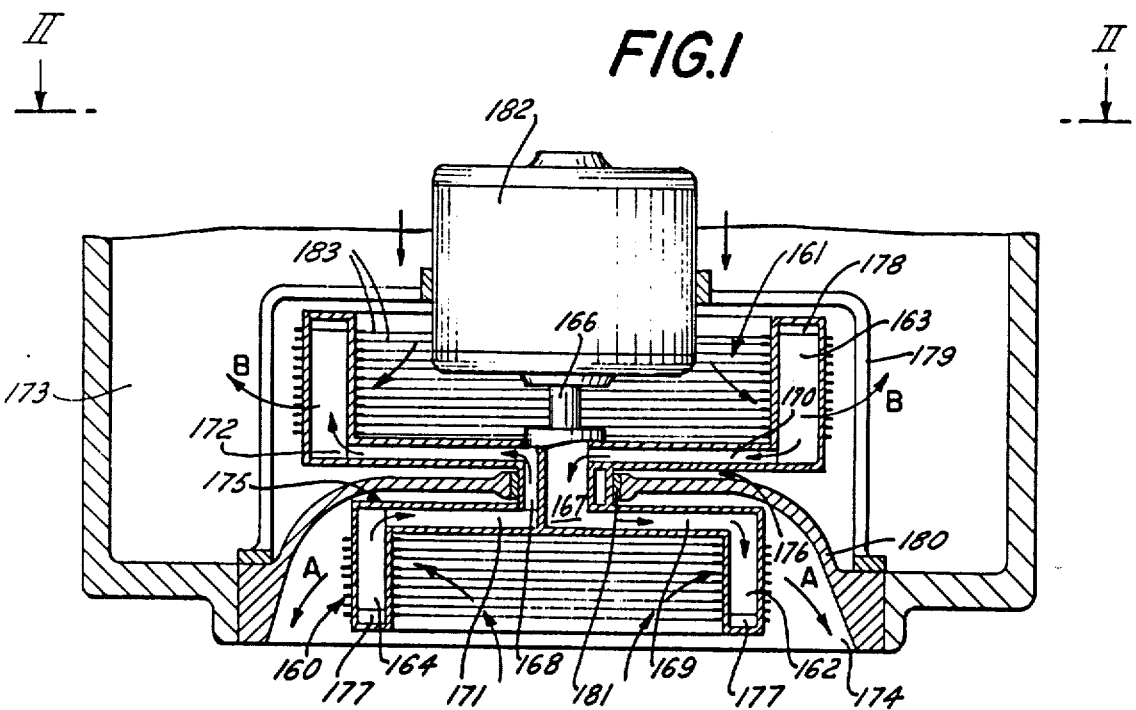
FIG. 1 is an axial sectional view of a system according to my invention for controlling the air temperature in a housing.
Figure 2:
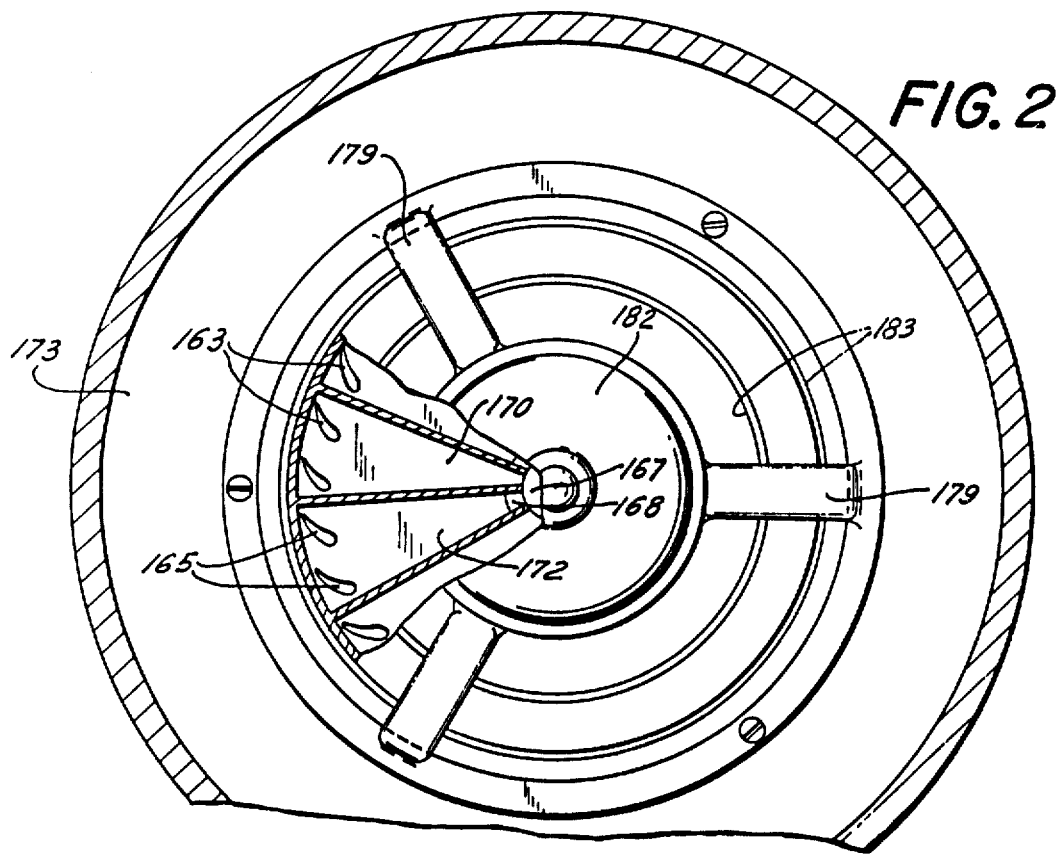
FIG. 2 is a face view, partly in section, taken on the line II—II of FIG. 1.

FIG. 1 illustrates an apparatus according to my invention mounted in a housing 173 which contains heat-generating electronic equipment (not shown). The enterior of housing 173 is sealed against the outside, i.e. against an adjoining chamber 174 on the other side of a housing wall 180. The housing 173 accommodates a rotary heat exchanger here shown as a centrifugal blower 161. A second rotary heat exchanger in the form of a centrifugal blower 160 is mounted in the outer chamber 174. The rotors 160, 161 respectively comprise hollow blades 162, 164 and 163, 165 forming part of a closed path for the circulation of a heat carrier. The peripheral alternation of blades 163, 165 in rotor 161 is shown in FIG. 2.

The coaxial rotors 160, 161 have a common shaft 166 which traverses the wall 180 and is provided with two concentric passages 167, 168 which respectively communicate with separate compartments 169, 170 and 171, 172 of sectoral shapes (cf. FIG. 2) forming radial extensions of these passages in confronting end walls 175, 176 of the rotors 160, 161. The channels of adjacent blades 162, 164 and 163, 165 of the rotors 160, 161 respectively communicate with the compartments 169, 171, 170, 172; thus, the channels of blades 164 and 165 are interconnected by the outer passage 168 of the shaft 166 while the channels of the blades 162 and 163 of the rotors 160, 161 communicate with each other by way of the cylindrical inner passage 167 of that shaft. The channels are also interconnected in pairs at the open ends of the generally cup-shaped rotors 160, 161 by short peripheral ducts 177 and 178. Thus, each blade channel has one end which communicates with one sectoral compartment in the hollow end wall of its rotor and another end connected to a blade channel communicating with the adjacent sectoral compartment. This establishes a closed circuit for the flow of a heat carrier in the rotors. The circuit can be traced from a blade 162 of the rotor 160 through compartment 170, blade 164, compartment 171, annular outer passage 168 of shaft 166, compartment 172 of rotor 161, blade 165, duct 178, blade 163, compartment 170, cylindrical passage 167 in shaft 166 and compartment 169 back to the blade 162. Arrows A and B in FIG. 1 indicate the direction of flow of a cool air stream in chamber 174 and of a warm air stream in housing 173. The illustrated apparatus preferably employs a low-viscosity fluid as its heat carrier.

The rotor 161 in housing 173 absorbs heat from the air displaced by it so as to cool same. The rotor 160 in the outer chamber 174 is cooled by the air it displaces. If the diameter of the inner rotor 161 exceeds the diameter of the outer rotor 160 as shown, the radially outward flow path of the cooled carrier in passage 172 and the radially inward flow path of the heated carrier in passage 170 of rotor 161 is lengthened relatively to the radially inward flow path of the cooled carrier in passage 171 and the radially outward flow path of the heated carrier in passage 169 of rotor 160. In view of the different densities of the heated and cooled carriers, the circulation-promoting centrifugal forces in passages 169 and 172 overbalance the countervailing centrifugal forces in passages 170 and 171 so as to create a thermosiphon effect which drives the carrier through its circuit.

Outer chamber 174 is separated from the interior of housing 173 by a seal 181 around shaft 166. Housing wall 180 is curved so as to form an outer recess accommodating the rotor 160.

Shaft 166 is driven by a motor 182 which is supported on wall 180 within housing 173 by three spider legs 179 in coaxial relationship with the rotor bodies. The axially extending rotor blades 162 – 165, whose streamlined profile is apparent from FIG. 2, are physically interconnected by a multiplicity of coaxial annular fins 183 promoting the heat exchange between the circulating carrier and the generally radial airflow in rotors 160 and 161 indicated by arrows A and B in FIG. 1.

I claim:

1. A temperature-control system for a space provided with means for maintaining a first fluid therein at a temperature differing substantially from that of a second fluid in an adjoining environment separated from said space by a wall, comprising:

a shaft passing through said wall;

drive means for rotating said shaft; and a pair of coaxial rotors on said shaft, one of said rotors having a first hollow body disposed in said space for contact with said first fluid, the other of said rotors having a second hollow body disposed in said environment for contact with said second fluid;

said shaft having two passages communicating with the interiors of both rotors and forming therewith a closed path sealed against the atmosphere for the circulation of a heat-carrier medium abstracting heat from the warmer one of said fluids and giving off heat to the colder one of said fluids, said path including first radial extensions of said passages in said first rotor and second radial extensions of said passages in said second rotor, said first radial extensions differing in length from said second radial extensions for creating a thermosiphon effect by lengthening the radially outward flow path of the cooled medium and the radially inward flow path of the heated medium relatively to the radially inward flow path of the cooled medium and the radially outward flow path of the heated medium, said thermosiphon effect being the sole means for circulating said medium.

2. A system as defined in claim 1 wherein the body of each of said rotors is generally cup-shaped, said radial extensions being disposed in the bottom of the cup.

3. A system as defined in claim 2 wherein said drive means comprises a motor mounted on said shaft within the cup-shaped body of one of said rotors.

4. A system as defined in claim 2 wherein the cup-shaped body comprises a set of channeled axially extending blades interconnected by a multiplicity of coaxial annular fins.

5. A system as defined in claim 1 wherein the interior of each rotor is partitioned into a first group of axially oriented channels, communicating with the radial extensions of one of said passages, and a second group of axially oriented channels, communicating with the radial extensions of the other of said passages, the groups of channels of each rotor being interconnected at their ends remote from said wall.

6. A system as defined in claim 1 wherein said passages are coaxially disposed in said shaft.

7. In combination, an enclosure for a space containing heat-generating equipment and a temperature-control system as defined in claim 1, said wall forming part of said enclosure, the radial extensions in said first rotor being longer than the radial extensions in said second rotor.

8. The combination defined in claim 7 wherein the body of each of said rotors is generally cup-shaped, said first body being of larger diameter than said second body.

9. The combination defined in claim 8 wherein said drive means comprises a motor mounted on said shaft in said enclosure within said first body.

10. The combination defined in claim 9 wherein said motor is provided with mounting means supporting same on said wall.

11. The combination defined in claim 8 wherein said wall is provided with an external recess accommodating said second body.

12. The combination defined in claim 7, further comprising seal means between said wall and said shaft separating said space from said adjoining environment.

* * * * *